United States Patent
Amerling et al.

(10) Patent No.: US 6,261,062 B1
(45) Date of Patent: Jul. 17, 2001

(54) ACTUATION SYSTEM FOR A CONTROLLABLE PITCH PROPELLER

(75) Inventors: Steven J Amerling, Fond du Lac; Kerry J. Treinen, Malone; Randall J. Poirier, Howards Grove, all of WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/483,845

(22) Filed: Jan. 17, 2000

(51) Int. Cl.$^7$ .................................................. B63H 1/06
(52) U.S. Cl. ................................... 416/147; 416/154
(58) Field of Search ................................ 416/147, 153, 416/154, 156

(56) References Cited

U.S. PATENT DOCUMENTS

| | | | |
|---|---|---|---|
| 2,869,650 | 1/1959 | Fairhurst et al. | 170/160 |
| 2,934,154 | * 4/1960 | Chilman | 416/154 |
| 3,003,567 | 10/1961 | Flaugh et al. | 170/160 |
| 3,067,825 | 12/1962 | Chilman et al. | 170/160 |
| 3,439,745 | * 4/1969 | Gaubis et al. | 416/154 |
| 3,711,221 | * 1/1973 | Almqvist | 416/154 |
| 3,794,441 | 2/1974 | Johnson | 416/152 |
| 4,419,050 | 12/1983 | Williams | 416/46 |
| 4,781,533 | 11/1988 | Andersson | 416/157 |
| 4,907,992 | 3/1990 | Cavallaro et al. | 440/50 |
| 5,073,134 | 12/1991 | Muller et al. | 440/50 |
| 5,122,036 | * 6/1992 | Dickes et al. | 416/156 |
| 5,226,844 | 7/1993 | Muller | 440/50 |
| 5,415,523 | 5/1995 | Muller | 416/35 |
| 5,584,655 | * 12/1996 | Deering | 416/156 |
| 5,836,743 | * 11/1998 | Carvalho et al. | 416/154 |
| 6,077,040 | * 6/2000 | Pruden et al. | 416/154 |

* cited by examiner

*Primary Examiner*—John Kwon
(74) *Attorney, Agent, or Firm*—William D. Lanyi

(57) ABSTRACT

A controllable pitch propeller device is provided with a pitch locking system that prevents a controllable pitch propeller blade from being inadvertently forced to an extreme end of travel in the event that hydraulic pressure is lost in either of two conduits or as a result of a pump failure. The hydraulic pressure in each of two conduits is used to overcome a check valve in the opposite conduit to allow return hydraulic fluid flow through that opposite conduit. In the event of a loss of hydraulic pressure, the pressure needed to overcome the check valve is absent and the check valve operates normally to block return flow to a source of hydraulic pressure, such as a pump. This blockage of return flow, in turn, prevents a hydraulically responsive element, such as a piston, from moving subsequent to the loss of pressure.

13 Claims, 4 Drawing Sheets

ACTUATION SYSTEM FOR A CONTROLLABLE PITCH PROPELLER

BACKGROUND OF THE INVENTION

1. Field of the Invention

The present invention is generally related to a controllable pitch propeller actuation system and, more specifically, to a system that locks the pitch of the blades of a controllable pitch propeller in position and prevents sudden movement of the propeller blades toward extreme positions if a hydraulic failure occurs in the pressurized supply lines to the control system.

2. Description of the Prior Art

Many different types of variable pitch propellers are known to those skilled in the art. Some variable pitch propellers respond to inherent forces, such as hydrodynamic forces and centrifugal forces, to affect the pitch of the blades of a propeller. Other types of variable pitch propellers are controllable pitch propellers that allow the pitch of the propeller blades to be changed through the external control of hydraulic pressures or mechanical linkages.

U.S. Pat. No. 3,003,567, which issued to Flaugh on Oct. 10, 1961, describes a combined mechanical pitch lock and pitch stop assembly. It has been recognized that hydraulically controlled variable pitch propellers must include lock means for preventing movement of the propeller blades to a low pitch position wherein no positive thrust is developed, and in some cases, negative thrust is developed, due to the centrifugal and aerodynamic blade twisting moments when an aircraft is in flight upon failure of the hydraulic control system. Among the objects of this patent are the provision of a combined mechanical pitch lock and pitch stop assembly for variable pitch propellers. The further provision of a mechanical pitch lock assembly for a variable pitch propeller which prevents movement of the blades in a decrease pitch direction under certain conditions, the further provision of a mechanical pitch lock control valve assembly for a variable pitch propeller which is responsive to the speed of propeller rotation and includes means for adjusting the speed setting of the pitch lock control means, and the provision of a mechanical pitch lock assembly including means for preventing locking operation thereof when the propeller is operated in the feathering and negative thrust ranges while permitting locking operation when the propeller is operated in the governing range.

U.S. Pat. No. 2,869,650, which issued to Fairhurst et al on Jan. 20, 1959, describes a pitch lock valve for hydraulic variable pitch propellers. It relates to hydraulically operated variable pitch propellers of the kind including a double acting hydraulic pitch change motor actuable by hydraulic fluid under pressure to adjust the pitch of the propeller. It also comprises a hydraulic fluid conduit for leading hydraulic fluid under pressure to the pitch change motor to actuate the motor in the sense to adjust the pitch of the propeller toward coarse pitch, and a hydraulic fluid conduit for leading hydraulic fluid under pressure to the pitch change motor to actuate the motor in the sense to adjust the pitch of the propeller toward fine or reverse pitch.

U.S. Pat. No. 3,067,825, which issued to Cullman et al on Dec. 11, 1962, describes a coarse pitch conduit valve and operator for hydraulic variable pitch propellers. The device relates to hydraulic variable pitch propellers of the kind including a double acting hydraulic pitch change motor actuable to adjust the pitch of the propeller blades.

U.S. Pat. 4,419,050, which issued to Williams on Dec. 6, 1983, describes a method and apparatus for controlling propeller pitch. The variable pitch propeller is controlled by a hydraulic mechanism responsive to forces urging an unsymmetrically mounted propeller towards its maximum pitch. Spring bias means maintains the propeller at minimum pitch under conditions of rest. The propeller is prevented from increased its pitch by the pressure produced on a closed hydraulic chamber until its reaches a predetermined revolution per minute speed when a centrifugal valve opens a first port and relieves the pressure in the cylinder and allows the propeller to increase in pitch. The increase in pitch opens a second port communicating with the pressure chamber, but that channel remains closed by a second valve that is normally closed but opens to response to a reduction in the throttle setting.

U.S. Pat. No. 4,781,533, which issued to Andersson on Nov. 1, 1988, describes a control system for a propeller with controllable pitch. An actuating system for a controllable pitch propeller comprises a hydraulic servo motor arranged in the propeller hub and connected mechanically to the propeller blades. Pressure medium is delivered to the servo motor, under the control of a control valve, from a pressure source which is connected to a stationary pressure medium chamber which embraces a rotatable shaft connected to the propeller and which is sealed against the outer surface of the shaft and communicates, via a radial pressure medium channel in the shaft, with an axial pressure medium channel located in the shaft and extending to the hydraulic servo motor.

U.S. Pat. No. 4,907,992, which issued to Cavallaro et al on Mar. 13, 1990, describes an oil distribution box for a marine controllable pitch propeller. The box is intended for use with a marine controllable pitch propeller of the type having a main hydraulic servo within a hub for controlling the pitch of propeller blades rotatably carried by the hub and including a directional valve actuated by a tubular valve rod extending through the propeller shaft from the oil distribution box. It comprises an outer stationary housing, a shaft received within the housing and coupled to the propeller shaft and an auxiliary servo chamber cylinder coupled to the shaft. A piston received in the servo chamber is coupled to the valve rod. Oil is supplied to the valve rod through an elongated annular supply chamber defined between the shaft and the valve rod by spaced-apart seals, a port in the valve rod opening to the supply chamber, a port in the shaft opening to the supply chamber and a journal clearance seal between the housing and shaft in register with the port in the shaft.

U.S. Pat. No. 5,836,743, which issued to Carvalho et al on Nov. 17, 1998, describes a variable pitch counterweighted propeller system with releasable hydraulic pitchlock. The hydraulic propeller system of this patent has a central hub including a stationary portion and a rotatable portion. A plurality of propeller blades are connected with the rotatable portion, wherein each of the plurality of propeller blades has an adjustable pitch and a counterweight biasing the blades in a first pitch direction. An actuating mechanism is used for adjusting the pitch of each of the plurality of propeller blades. A valve for locking the propeller blades at a last commanded pitch is further provided. At least the valve and the actuating mechanism are located on and rotatable with the rotatable portion.

U.S. Pat. No. 5,073,134, which issued to Muller et al on Dec. 17, 1991, describes a boat drive with an adjustable pitch propeller. The boat drive of the type in which a housing outside the hull of the boat and below the water level receives a hollow propeller shaft driven by a drive shaft connected to the propeller shaft by a transmission is disclosed. The hub of a variable pitch propeller is mounted on the propeller shaft and the axially extending stems which adjust the pitch on this hub are engaged by a push rod extending through the prop shaft and connected to a double acting cylinder at the opposite end from that at which the rod is connected to the stems.

U.S. Pat. No. 5,226,844, which issued to Muller on Jul. 13, 1993, describes an actuator for a variable pitch propeller. A drive for a boat has a propeller hub rotatable about a main axis extending in a normal travel direction, a plurality of blades projecting generally radially of the main axis from the hub and each pivotal so as to be of variable pitch, and respective blade rods extending axially and displaceable axially relative to the hub to vary the pitch of the blades. A stator carried on the boat downstream in the direction from the hub and nonrotatable about the axis rotatably supports a cylinder housing that is releasably connected to the rods for joint axial movement therewith. A piston displaceable along the axis in the cylinder is releasably connected to the hub for joint axial movement therewith. Pressurizable lines extending through the stator are connected to the cylinder for alternately pressurizing the piston and thereby relatively axially shifting the rods and hub.

U.S. Pat. No. 5,415,523, which issued to Muller on May 16, 1995, describes a control system for a variable pitch boat propeller. The marine drive has a propeller that is rotatable about a drive axis and has a plurality of blades themselves pivotable about respective blade axis projecting generally radially from the drive axis and each movable between a low pitch end position extending generally parallel to a plane perpendicular to the drive axis and a high pitch end position extending at a large acute angle to the plane. An engine rotates the propeller about the drive axis at a variable drive speed in a forward rotation direction. The blade axes are so positioned relative to the respective blades that on forward rotation of the propeller that blades are urged into one of their end positions. A single acting hydraulic actuator is connected to the blades and has a compartment pressurizable to displace the blades into one of their end positions.

U.S. Pat. No. 3,794,441, which issued to Johnson on Feb. 26, 1974, describes a variable pitch propeller. The Johnson patent pertains to novel means whereby the blade pitch in a propeller may be varied by employing uni-directional rotation of a propeller shaft, a portion of the power driving the propeller, and a pair of braking means. A propeller hub having a plurality of pivotally mounted blades is mounted on the propeller shaft. A blade pitch actuator member has a hub end and a brake end and extends through the propeller shaft into the propeller hub. An eccentric slider block is secured to the hub end of the actuator member and is interconnected to each of the propeller blades. An actuator gear is screw mounted on the brake end of the actuator member. Three pairs of planetary pinions are provided with each pair secured to a common shaft. The pairs are mounted on the propeller shaft in substantially parallel spaced relation to the axis of rotation of the propeller shaft. One of each pair of planetary pinions is meshed with the actuator gear and further meshed with an outer sun gear that is secured to a first brake actuated member.

The patents described above are hereby explicitly incorporated by reference in the description of the preferred embodiment of the present invention.

In a controllable pitch propeller used in conjunction with a marine propulsion system, it is desirable to provide a means that locks the pitch of the blades in position under certain circumstances when hydraulic pressure is no longer available to control the pitch of the blades. In systems that are known to those skilled in the art, sudden loss of pressure can cause the hydraulic system to force the propeller blades to extreme pitch positions with an abrupt and uncontrolled motion. This circumstance can occur when a hydraulic pressure line is ruptured or when a hydraulic pump or directional control valve fails.

SUMMARY OF THE INVENTION

The present invention addresses the problem of a loss of hydraulic pressure to a controllable pitch propeller by preventing uncontrolled rapid movement of the blades relative to the propeller hub and thus preventing any pitch changes subsequent to the failure of hydraulic pressure.

The controllable pitch propeller device made in accordance with the principles of the preferred embodiment of the present invention comprises a hydraulically responsive element, such as a piston or other moveable member, which is moveable in two directions in response to the relative magnitudes of fluid pressure in first and second chambers. For example, the first and second chambers can be the portions of a cylinder on opposite sides of the hydraulic responsive element, such as a piston, disposed within the cylinder. The present invention further comprises a moveable blade of the controllable pitch propeller which is connected to the hydraulically responsive element to change pitch in response to movement of the hydraulically responsive element. In other words, the moveable blade can be mechanically linked to the piston so that reciprocal movement of the piston within its cylinder causes the moveable blade to rotate about an axis which is generally perpendicular to an axis about which the propeller rotates. The present invention further comprises a source of hydraulic pressure, which can be a hydraulic pump.

The controllable pitch propeller device of the present invention further comprises a first conduit connected in fluid communication with the first chamber and a first check valve for inhibiting flow within the first conduit in a direction from the first chamber toward the hydraulic pressure source. It further comprises a second conduit connected in fluid communication with the second chamber and a second check valve for inhibiting flow within the second conduit in a direction from the second chamber toward the hydraulic pressure source. A first actuator is connected between the first conduit and the second check valve to open the second check valve in response to a first pressure within the first conduit which is greater than a first predetermined magnitude in order to allow fluid to pass through the second check valve from the second chamber toward the hydraulic pressure source when the first pressure exceeds the first predetermined magnitude. Similarly, a second actuator is connected between the second conduit and the first check valve to open the first check valve in response to a second pressure within the second conduit which is greater than a second predetermined magnitude in order to allow fluid to pass through the first check valve from the first chamber toward the hydraulic pressure source when the second pressure exceeds the second predetermined magnitude.

The present invention can further comprise a valve connected in fluid communication between the first and second conduits and the source of hydraulic pressure, such as the pump. The valve has a first position and a second position. The first position causes pressurized fluid from the source of hydraulic pressure to flow through the first conduit into the first chamber while the second position causes pressurized fluid from the source of hydraulic pressure to flow through the second conduit into the second chamber.

The first and second actuators can be elements of a piloted manifold into which the first and second conduits are connected in fluid communication. The piloted manifold is therefore connected between the source of pressure and the first and second chambers.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
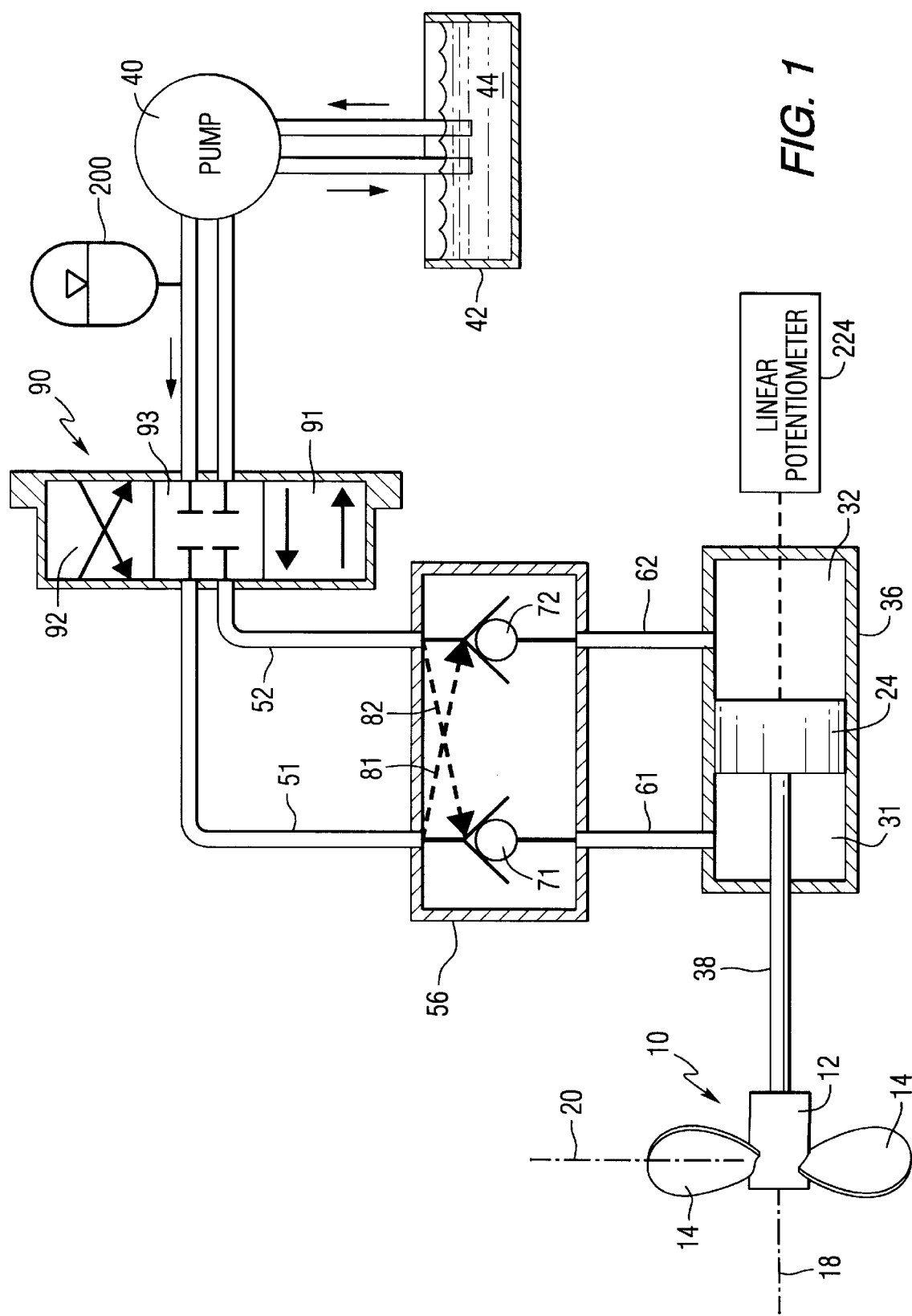
FIG. 1 is a highly simplified schematic representation of a controllable pitch propeller device made in accordance with the present invention.

Throughout the description of the preferred embodiment of the present invention, like components will be identified by like reference numerals.

FIG. 1 is a highly simplified schematic illustration of the present invention. A controllable pitch propeller 10 comprises a hub 12 and a plurality of blades 14. The hub 12 is rotatable about a centerline 18 which is typically coaxial with the centerline of a propeller shaft (not shown in FIG. 1) within a gear housing of a sterndrive or an outboard motor. Each of the blades 14 is typically attached to a rotatable pedestal that is pivotally attached to the hub 12 and rotatable about a centerline 20. The blades 14 are each rotatable about their individual centerlines 20 along with the associated pedestal portion. The hydraulically responsive element, such as piston 24, is moveable in two directions in response to relative magnitudes of fluid pressure in a first chamber 31 and a second chamber 32. In a typical application of the present invention, the piston 24 is disposed within a cylinder 36 that defines the first and second chambers, 31 and 32, on opposite sides of the piston 24. However, it should be understood that various types of rotatable hydraulically responsive elements can also be used for these purposes. A connecting rod 38 is attached to the piston 24 and connected, by mechanical linkages not shown in FIG. 1, to the pedestals associated with each of the blades 14. Several of the patents described above in the description of the prior art disclose types of mechanical linkages between an axially moving piston and rotatable pedestals attached to blades of a controllable pitch propeller. The specific details of the type of mechanical linkage between the connecting rod 38 and the blades 14 will not be described in detail herein and is not limiting to the present invention. Throughout the description of the preferred embodiment of the present invention, it should be clearly understood that the arrangement of the cylinder 36, piston 24, and propeller 10 can be of two distinct types. First, one type of arrangement could have the blades 14 be moved to a minimum pitch configuration when the piston 24 reaches a maximum extent of travel within the cylinder in one direction and achieve a maximum pitch configuration when the piston 24 reaches its end of travel in the opposite direction within the cylinder 36. An alternate arrangement of the cylinder 36, piston 24, and propeller 10 could have the blades 14 achieve a maximum reverse pitch configuration when the piston 24 reaches one end of travel within the cylinder 36 and achieve a maximum forward pitch when the piston 24 reaches the opposite end of the cylinder 36. Under this type of arrangement, a minimum pitch of the blades 14 would occur when the piston 24 is in a central position within the cylinder 36 between its two maximum limit of travel within the cylinder. The advantages of the present invention can be achieved in either circumstance.

With continuing reference to FIG. 1, it should be understood that the propeller 10 does not move axially to the left and right in FIG. 1, but rotates about axis 18. Axial movement of the connecting rod 38 toward the left or right in FIG. 1, causes the internal linkages within the hub 12 to cause the blades 14 to rotate about the respective axes of rotation 20.

A pump 40 is associated with a reservoir 42 to draw hydraulic fluid 44 from the reservoir and into the pump 40 and also to return the hydraulic fluid to the reservoir 42. A first conduit 51 is indirectly connected in fluid communication with the first chamber 31 through a piloted manifold 56. Conduits 61 and 62 connect the piloted manifold 56 with the first and second chambers, 31 and 32, of cylinder 36 as shown in FIG. 1. A first check valve 71 is provided for inhibiting flow in a direction from the first chamber 31 toward the hydraulic pressure source 40. A second check valve 72 is provided for inhibiting flow in a direction from the second chamber 32 toward the hydraulic pressure source 40. It should be understood that hydraulic fluid can flow in either direction within the first and second conduits, 51 and 52, and in either direction through conduits 61 and 62. A pressure accumulator 200 is associated with the conduits connected to the pump 40. As will be described in greater detail below, in conjunction with FIG. 4, the valve 90 which is shown symbolically in FIG. 1 can be functionally replaced with a combination of four valves operated in coordination with each other.

A first actuator 81 is connected between the first conduit 51 and the second check valve 72 to open the second check valve 72 in response to a first pressure within the first conduit 51 which is greater than a predetermined magnitude in order to allow fluid to pass through the second check valve 72 from the second chamber 32 toward the hydraulic pressure source 40 when the first pressure exceeds the first predetermined magnitude. Typically, the check valves, 71 and 72, are spring loaded to urge a ball into a blocking position against a seat within the conduit. This is schematically represented in FIG. 1. The spring constant of the spring or other resilient member typically determines the required pressure magnitude needed to overcome the spring and allow the ball within the check valve to move away from its seat.

A second actuator 82 is connected between the second conduit 52 and the first check valve 71 to open the first check valve 71 in response to a second pressure within the second conduit 52 which is greater than a second predetermined magnitude in order to allow fluid to pass through the first check valve 71 from the first chamber 31 toward the hydraulic pressure source 40 when the second pressure exceeds the second predetermined magnitude. Similarly, the second predetermined magnitude is typically determined by a spring within the first check valve 71. In other words, the pressures in the first and second conduits, 51 and 52, operate to release the check valve associated with the other of the two conduits. Pressure in the first conduit 51 can open the second check valve 72 and pressure within the second conduit 52 can open the first check valve 71. The structure within the piloted manifolds 56 will be described in greater detail below in conjunction with FIG. 2.

With continued reference to FIG. 1, a valve 90 is connected in fluid communication between the first and second conduits, 51 and 52, and the source of hydraulic pressure 40. The valve 90 has a first position 91 and a second position 92. The first position 91 causes pressurized fluid from the hydraulic pressure source 40 to flow through the first conduit 51 into the first chamber 31 while the second position 92 causes pressurized fluid from the hydraulic pressure source 40 to flow through the second conduit 52 into the second chamber 32. Position 93 prevents fluid flow in either direction.

In FIG. 1, a sensor 224, which can be a linear potentiometer, is used to determine the physical position of the piston 24 within the cylinder 36. A controller, which can be an engine control unit (ECU), can be used to control the positions of the valve elements, 91, 92, and 93, and receive signals from the linear potentiometer 224 that are representative of the actual position of the piston 24. In this way, a relatively simple control circuit can compare the response by the piston 24 to commands issued to the valve 90. Since this type of control circuit is very well known to those skilled in the art, it will not be described in detail herein. However, it should be clearly understood that a signal from the linear potentiometer 224 can be used to determine if the piston 24 has moved beyond a desired position. The ability of an engine control unit to respond to an over travel of the piston 24, is indicated by the linear potentiometer 224, is naturally dependent on the movement of the piston 24 being controlled and not being abrupt with an instantaneous movement from a current position to an extreme limit of travel.

If pressurized fluid is flowing from the pump, through the first position 91 of valve 90 and through the first conduit 51, this pressure forces the first check valve 71 open through normal operation of the check valve. The fluid then flows through conduit 61 into the first chamber 31 and causes piston 24 to move toward the right in FIG. 1. This, in turn, reduces the volume of the second chamber 32 and forces the fluid in the second chamber 32 to flow upward in FIG. 1 through conduit 62. Normally, the second check valve 72 would block this return flow from the second chamber 32 to the pump 40. However, the first actuator 81 uses the pressure within the first conduit 51 to open the second check valve 72 and allow the return flow from conduit 62 to flow into the second conduit 52, through valve 90, and back to the pump 40. This procedure is reversed when the valve 90 is in its second position 92. The pump 40 would then provide pressure through the second conduit 52, the second check valve 72, and conduits 62 into the second chamber 32. This would move the piston 24 toward the left in FIG. 1 and fluid from the first chamber 31 would flow through conduit 61 toward the piloted manifold 56. In order to overcome the effect of the first check valve 71, the second actuator 82 would open the first check valve 71 in response to pressure in the second conduit 52. This would allow the fluid to flow upward through the first conduit 51 and through the second position 92 of valve 90 to the pump 40.

In order to completely understand and appreciate the advantages provided by the present invention, it is helpful to understand the reaction of the piston 24 to a severed hydraulic line in circumstances without the provision of the piloted manifold 56 by the present invention. If the valve 90 is in a position to move the piston 24 in either direction and pressure is provided by the pump 40 a rupture in a return fluid conduit would allow a sudden and abrupt movement of the piston 24 in the direction in which it was moving towards its limit of travel within the cylinder 36. This abrupt movement would occur virtually instantaneously following a rupture of the return hydraulic line. With no resistance to its travel, the piston 24 would move in a sudden and uncontrolled manner toward the limit of travel within the cylinder 36. Regardless of the existence of a linear potentiometer 224 or any other type of sensor, the movement would be too sudden for any control system to adequately react to deactivate the pump 40. The pressure within the pressurized hydraulic line would uncontrollable force the piston 24 to the extreme limit of travel in the direction that it was moving when the rupture occurred. By providing the piloted manifold 56 in the location shown in FIG. 1, the present invention prevents this sudden abrupt movement and allows a control system to react to a signal from the linear potentiometer 224 or any other sensor used to indicate the location of the piston 24 within the cylinder 36.

With continued reference to FIG. 1, the present invention provides a significant advantage in the event that either the first or second conduits, 51 or 52, is severed or damaged to cause leakage from the damaged conduit. In the event that either of the first and second conduits is damaged and hydraulic fluid leaks therefrom, the pressure within that damaged conduit will not be sufficient to overcome the natural operation of the check valve associated with the other conduit. That check valve will then remain closed and prevent the return of fluid from the associated chamber, 31 and 32, back to the pump 40. By inhibiting the flow of return fluid in this manner, the movement of the piston 24 within the cylinder 36 is significantly slowed. Although the piston 24 may still move past its desired position, the movement is sufficiently slowed to allow a control system to react to the signal from the linear potentiometer 224 that would naturally indicate an over travel of the piston 24 beyond its intended position. This circumstance would naturally lead the control system to generate an alarm condition signal and would prevent further changes in the position of the valve 90. This reaction to an over travel condition of the piston 24 would prevent further movement of the piston 24. Any control system known to those skilled in the art would monitor the physical position of the piston 24 in response to commands issued to the valve 90 to achieve a desired position. The comparison of the actual position of the piston 24 to the desired position would reveal a fault condition which would naturally be followed by an alarm and a shutdown procedure. This, in turn, would prevent further movement of the piston 24 toward its extreme limit of travel and would maintain the pitch of the blades 14 at a position generally similar to the position in which the blades were placed prior to the most recent command to the valve 90 during which the hydraulic line rupture was detected.

Figure 2:
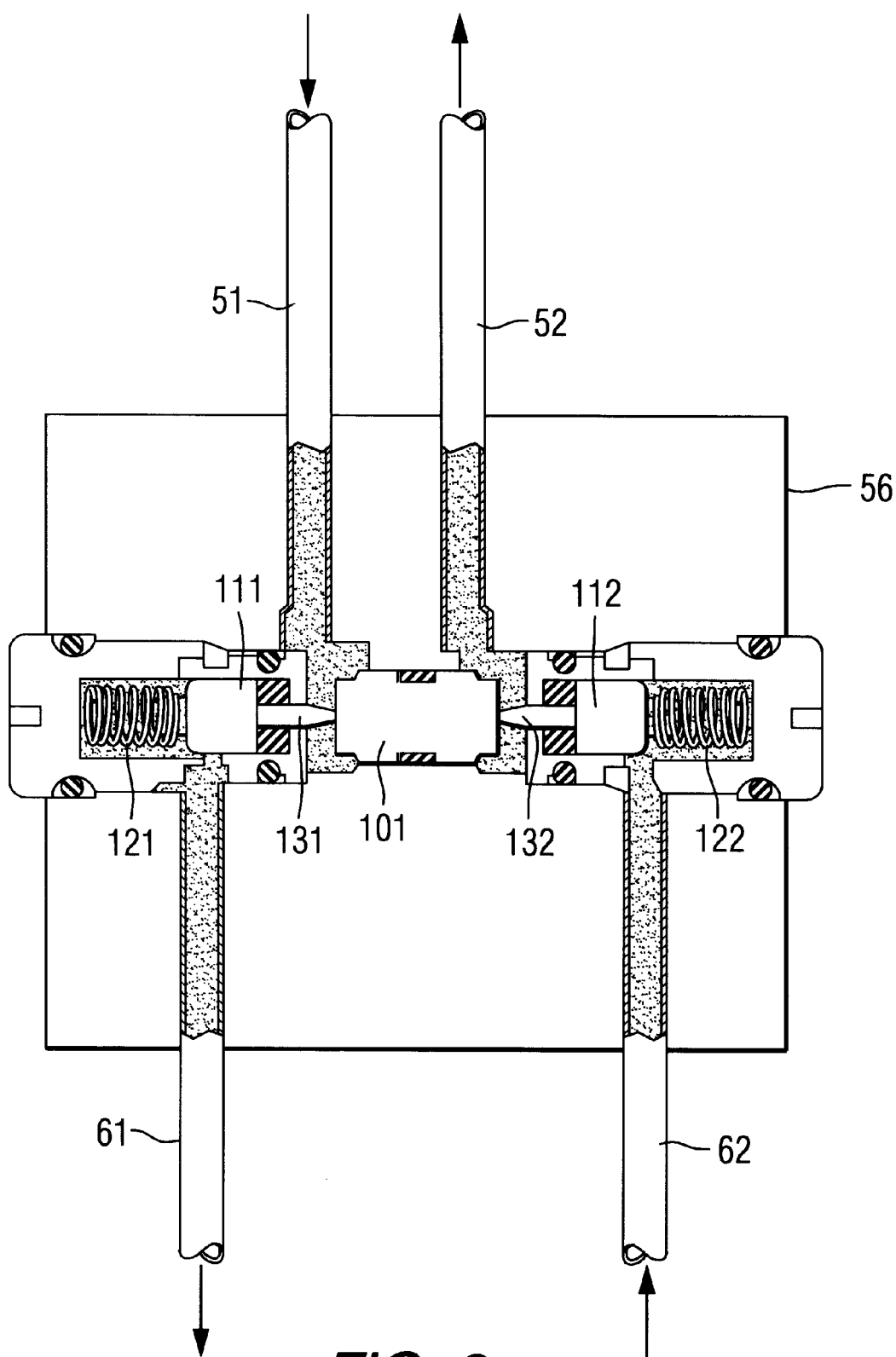
FIG. 2 is a section view of a piloted manifold used in the present invention.

FIG. 2 shows a section view taken through the piloted manifold 56. A reciprocating piston 101 is responsive to the differential pressure between the first and second conduits, 51 and 52. In other words, if the pressure in the first conduit 51 is greater than the pressure in the second conduit 52, the reciprocating piston 101 will move toward the right in FIG. 2. If the pressure differential is in the opposite direction, the reciprocating piston 101 will move toward the left in FIG. 2. Two hex-shaped pistons, 111 and 112, are arranged as shown within generally cylindrical openings and each is resisted by an associated spring, 121 and 122, respectively. When the pressure in the first conduit 51 is greater than the pressure in the second conduit 52, the reciprocating piston 101 is moved toward the right and this pushes the hex-shaped piston 112 toward the right against the resistance of spring 122. This allows hydraulic fluid to flow upward through conduit 62 and through the gaps formed between the surface of the hex-shaped piston 112 and its surrounding cylindrical containment. The hydraulic fluid flows axially, from right to left, past the hex-shaped piston 112 and around the extension 132 projecting from it. The fluid then flows upward through the second conduit 52. Meanwhile, the extension 131 of hex-shaped piston 111 is moved toward the left under the influence of the pressure within the first conduit 51 to allow flow of hydraulic fluid downward in FIG. 2 through conduit 61. When the pressure differential is reversed, the basic operation described above is also reversed. In this way, the combination of the reciprocating piston 101 in conjunction with hex-shaped pistons, 111 and 112, form the first and second actuators described above. The higher pressure, in either the first or second conduits, opens the check valve associated with the lower pressure conduit to allow hydraulic fluid to flow back through that check valve toward the source of hydraulic pressure. This facilitates the movement of the piston 24 within the cylinder 36. If either of the first or second conduits is ruptured, the check valve in line with the other conduit will not be opened and the return flow will be blocked. This will prevent the piston from being rapidly forced to its maximum end of travel. Although a rupture of a hydraulic line would normally lead to a movement of the piston 24 to a position beyond its intended position, this improper movement of the piston 24 would be sensed by the linear potentiometer 224 and the existing command to the valve 90 would be stopped by any control system such as those known to those skilled in the art. The existence of the piloted manifold 56 has the effect of slowing the movement of the piston 24 during circumstances such as those described above, because the loss of pressure in the associated actuator, 81 or 82, would fail to move the associated check valve, 71 or 72, to allow hydraulic fluid to move back toward the pump 40 and reservoir 42. This slowing of the piston 24 assures that it moves in an controlled manner and allows the controlled system to respond to an over travel of the piston 24 before it reaches its extreme limit of travel. The resulting effect of the operation of the present invention is to lock the pitch of the blades of the controllable pitch propeller in approximately their current position when a rupture of this type occurs. It should also be realized that a failure of the pump 40 or directional control valve 90 will have this same effect because of the operation of the present invention.

Figure 3:
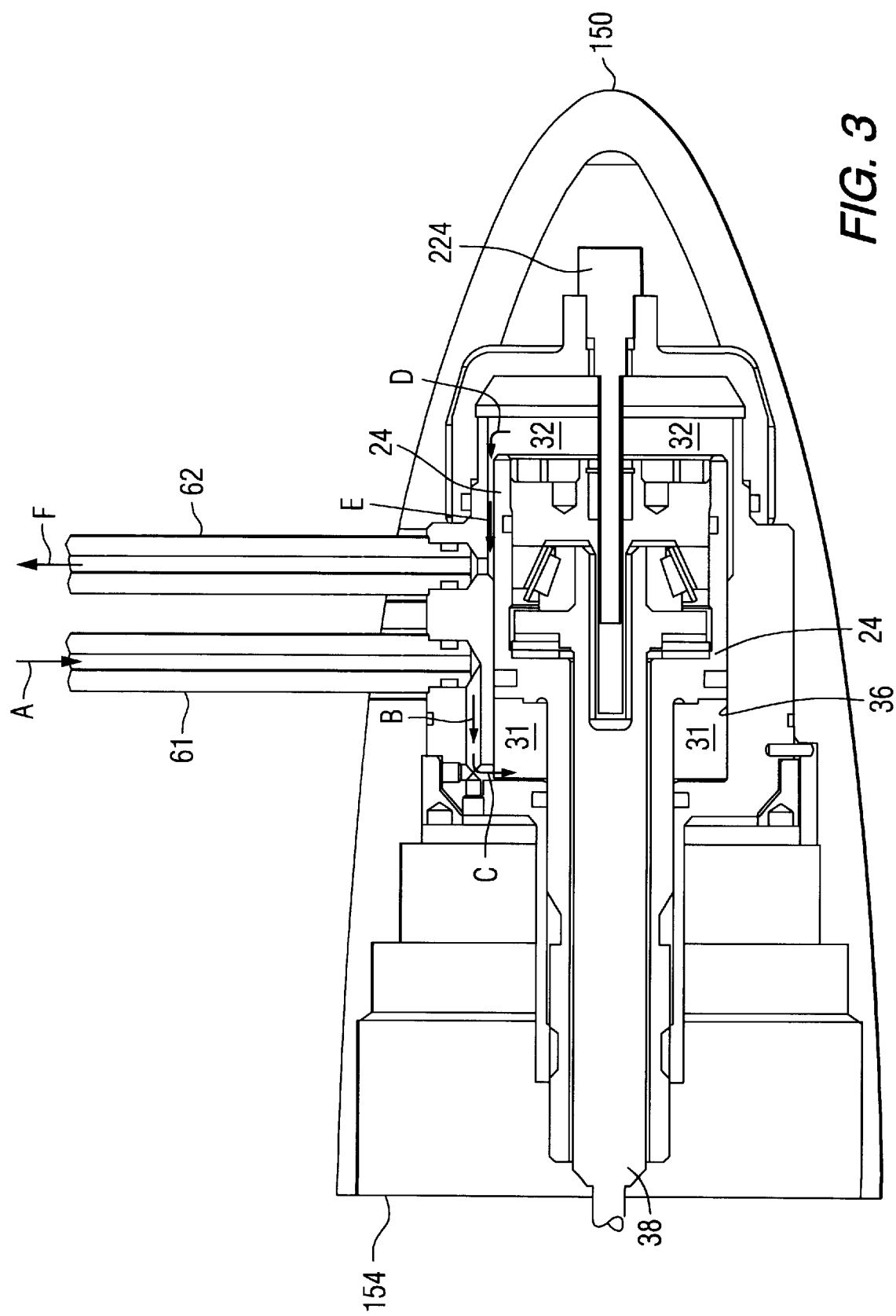
FIG. 3 is a section view of the present invention incorporated in a gearcase of a sterndrive unit.

FIG. 3 is a section view of a torpedo-shaped gearcase of a sterndrive. The front of the gearcase 150 points in the direction of motion of the marine propulsion device. Behind the rear of the gearcase 154, a mechanism would typically be attached to effectuate the connection between the connecting rod 38 and the internal mechanism of a controllable pitch propeller 10 located within its hub 12. The piston 24 is located for reciprocating motion within the cylinder 36. In response to differential pressures in the first chamber 31 and the second chamber 32, the piston 24 is moved toward the left or right in FIG. 3. This movement causes the connecting rod 38 to move toward the left or right in response to movement of the piston 24. To move the piston 24 toward the right in FIG. 3, pressurized fluid would be provided in conduit 61. This pressurized fluid, flowing in the direction identified by arrow A, would also flow along the path identified by arrows B and C into the first chamber 31. The pressure within the first chamber 31 would cause the piston 24 to move toward the right. This movement of the piston 24 would decrease the volume of the second chamber 32 and the fluid in the second chamber 32 would flow in the directions represented by arrows D and E in FIG. 3. The flow represented by arrow E is around the piston within a diameter of the cylinder 36 that is slightly greater than the outer diameter of the piston 24. This flow then continues to the point where the conduit 62 is connected in fluid communication with the annular spacing surrounding the piston 24. From there, the hydraulic fluid continues to flow in the direction represented by arrow F. Although not shown in FIG. 3, it should be understood that the piloted manifold 56 is disposed above the conduits, 61 and 62, in the manner described above in conjunction with FIGS. 1 and 2. Various types of piloted manifolds 56 are well known to those skilled in the art and are commercially available. Also shown in FIG. 3 is the linear potentiometer 224 that is used to detect the position of the piston 24 within the cylinder 36. When the piston 24 moves beyond its intended position, because of a rupture or leak in a hydraulic fluid line, the linear potentiometer 224 detects this improper movement and an associated engine control can react to place the valve 90, as described above in conjunction with FIG. 1, in position 93 to stop further movement of the piston 24 within the cylinder 36.

Figure 4:
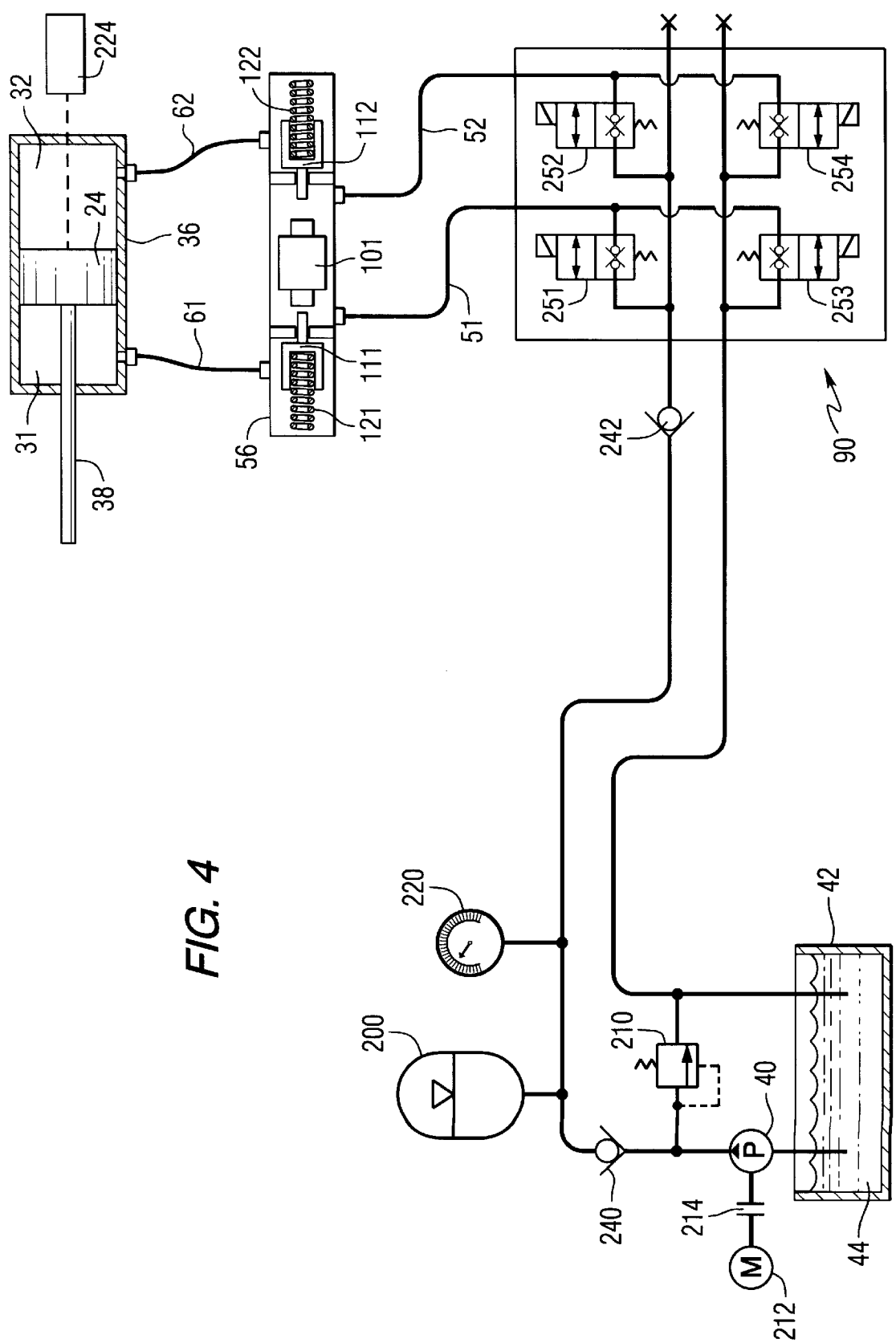
FIG. 4 is an alternative representation of the hydraulic circuit shown in FIG. 1.

FIG. 4 is generally similar to the illustration of FIG. 1, but with the valve 90 shown in greater detail and with a corresponding adjustment to the fluid lines extending from the pump 40 and reservoir 42 to the valve 90. The arrangement shown in FIG. 4 between the valve 90 and the cylinder 36 is generally similar to that described above in conjunction with FIG. 1 and will not be restated below.

In a typical arrangement of the hydraulic control system for the propeller, a motor 212 would be used to drive the pump 40 through an appropriate connection 214. Check valves 240 and 242 are provided in the pressure line between the pump 40 and the valve 90. A pressure relief valve 210 can be provided to allow fluid to flow from the pump 40 back to the reservoir 42 in the event that the pressure provided by the pump 40 exceeds a predetermined limit, such as 3,000 lbs per square inch. The accumulator 200 can typically be set to maintain a pressure of 3,000 psi or less within the fluid line extending between the pump 40 and the valve 90 and in which the two check valves, 240 and 242, are provided. A pressure transducer 220 can be provided in this hydraulic line to monitor the pressure within the system and turn the pump on and off.

With particular reference to valve 90 in FIG. 4, it can be seen that the valving function of valve 90, which is symbolically shown in FIG. 1, can be provided by four individual valves, 251, 252, 253, and 254. A control system can operate the individual valve elements in tandem to select the direction of hydraulic fluid flow through hydraulic lines 51 and 52. For example, if valve elements 251 and 254 are activated to allow fluid flow through them, with the other valve elements closed, pressure will flow through check valve 242 and valve element 251 to line 51 toward the piloted manifold 56. Hydraulic fluid will return through line 52 and valve element 254 to return to the reservoir 42. If valve elements 252 and 253 are activated to allow fluid flow through them while valve elements 251 and 254 are deactivated, the hydraulic flow will be in the opposite direction.

It should be clearly understood that the provision of the piloted manifold 56 as described above is not specifically intended to absolutely prevent all improper movement of the piston 24 within the cylinder 36, but its primary function is to make sure that the movement of the piston 24 is controlled and not sudden or abrupt even when a hydraulic line is ruptured. In accordance with the present invention, a hydraulic rupture or malfunction will still cause the piston 24 to move beyond its intended position, but in a slowed and controlled manner that allows any associated control system, such as an engine control unit of a marine propulsion system, to react to a signal from the linear potentiometer 224 and cease further flow of hydraulic fluid through the hydraulic lines in response to this error condition. Under most known control systems that would be provided by those skilled in the art, the movement of the piston 24 could easily be stopped after only a minor over travel within the cylinder 36. This, in turn, will cause the pitch of the blades 14 of a controllable pitch propeller 10 to be maintained in approximately the same pitch condition that they were prior to the hydraulic failure.

Although the present invention has been described in considerable detail and illustrated with particular specificity to disclose a preferred embodiment of the present invention, it should be understood that alternative embodiments are also within its scope.

What is claimed is:

1. A controllable pitch propeller device, comprising:

a hydraulically responsive element which is movable in two directions in response to the relative magnitudes of fluid pressure in first and second chambers;

a movable blade of said controllable pitch propeller which is connected to said hydraulically responsive element to change pitch in response to movement of said hydraulically responsive element;

a source of hydraulic pressure;

a first conduit connected in fluid communication with said first chamber;

a first check valve for inhibiting flow within said first conduit in a direction from said first chamber toward said hydraulic pressure source;

a second conduit connected in fluid communication with said second chamber;

a second check valve for inhibiting flow within said second conduit in a direction from said second chamber toward said hydraulic pressure source;

a first actuator connected between said first conduit and said second check valve to open said second check valve in response to a first pressure within said first conduit which is greater than a first predetermined magnitude in order to allow fluid to pass through said second check valve from said second chamber toward said hydraulic pressure source when said first pressure exceeds said first predetermined magnitude; and a second actuator connected between said second conduit and said first check valve to open said first check valve in response to a second pressure within said second conduit which is greater than a second predetermined magnitude in order to allow fluid to pass through said first check valve from said first chamber toward said hydraulic pressure source when said second pressure exceeds said second predetermined magnitude.

2. The device of claim 1, wherein:

said hydraulically responsive element is a piston disposed within a cylinder between said first and second chambers.

3. The device of claim 1, wherein:

said source of hydraulic pressure is a hydraulic pump.

4. The device of claim 2, wherein:

said movable blade is rotatable relative to a hub of said propeller and said movable blade is rotatably attached to a shaft which is attached to said piston.

5. The device of claim 1, further comprising:

a valve connected in fluid communication between said first and second conduits and said source of hydraulic pressure, said valve having a first position and a second position, said first position causing pressurized fluid from said source of hydraulic pressure to flow through said first conduit into said first chamber, said second position causing pressurized fluid from said source of hydraulic pressure to flow through said second conduit into said second chamber.

6. The device of claim 1, wherein:

said first and second actuators are elements of a piloted manifold into which said first and second conduits are connected in fluid communication.

7. A controllable pitch propeller device, comprising:

a hydraulically responsive element which is movable in two directions in response to the relative magnitudes of fluid pressure in first and second chambers;

a movable blade of said controllable pitch propeller which is connected to said hydraulically responsive element to change pitch in response to movement of said hydraulically responsive element;

a source of hydraulic pressure, said hydraulically responsive element being a piston disposed within a cylinder between said first and second chambers and said source of hydraulic pressure being a hydraulic pump;

a first conduit connected in fluid communication with said first chamber;

a first check valve for inhibiting flow within said first conduit in a direction from said first chamber toward said hydraulic pressure source;

a second conduit connected in fluid communication with said second chamber;

a second check valve for inhibiting flow within said second conduit in a direction from said second chamber toward said hydraulic pressure source;

a first actuator connected between said first conduit and said second check valve to open said second check valve in response to a first pressure within said first conduit which is greater than a first predetermined magnitude in order to allow fluid to pass through said second check valve from said second chamber toward said hydraulic pressure source when said first pressure exceeds said first predetermined magnitude; and a second actuator connected between said second conduit and said first check valve to open said first check valve in response to a second pressure within said second conduit which is greater than a second predetermined magnitude in order to allow fluid to pass through said first check valve from said first chamber toward said hydraulic pressure source when said second pressure exceeds said second predetermined magnitude.

8. The device of claim 7, further comprising:

a valve connected in fluid communication between said first and second conduits and said source of hydraulic pressure, said valve having a first position and a second position, said first position causing pressurized fluid from said source of hydraulic pressure to flow through said first conduit into said first chamber, said second position causing pressurized fluid from said source of hydraulic pressure to flow through said second conduit into said second chamber.

9. The device of claim 8, wherein:

said movable blade is rotatable relative to a hub of said propeller and said movable blade is rotatably attached to a shaft which is attached to said piston.

10. The device of claim 9, wherein:

said first and second actuators are elements of a piloted manifold into which said first and second conduits are connected in fluid communication.

11. A controllable pitch propeller device, comprising:

a hydraulically responsive element which is movable in two directions in response to the relative magnitudes of fluid pressure in first and second chambers;

a movable blade of said controllable pitch propeller which is connected to said hydraulically responsive element to change pitch in response to movement of said hydraulically responsive element;

a source of hydraulic pressure, said hydraulically responsive element being a piston disposed within a cylinder between said first and second chambers and said source of hydraulic pressure being a hydraulic pump, said movable blade being rotatable relative to a hub of said propeller and said movable blade being rotatably attached to a shaft which is attached to said piston;

a first conduit connected in fluid communication with said first chamber;

a first check valve for inhibiting flow within said first conduit in a direction from said first chamber toward said hydraulic pressure source;

a second conduit connected in fluid communication with said second chamber;

a second check valve for inhibiting flow within said second conduit in a direction from said second chamber toward said hydraulic pressure source;

a first actuator connected between said first conduit and said second check valve to open said second check valve in response to a first pressure within said first conduit which is greater than a first predetermined magnitude in order to allow fluid to pass through said second check valve from said second chamber toward said hydraulic pressure source when said first pressure exceeds said first predetermined magnitude; and a second actuator connected between said second conduit and said first check valve to open said first check valve in response to a second pressure within said second conduit which is greater than a second predetermined magnitude in order to allow fluid to pass through said first check valve from said first chamber toward said hydraulic pressure source when said second pressure exceeds said second predetermined magnitude.

12. The device of claim 11, further comprising:

a valve connected in fluid communication between said first and second conduits and said source of hydraulic pressure, said valve having a first position and a second position, said first position causing pressurized fluid from said source of hydraulic pressure to flow through said first conduit into said first chamber, said second position causing pressurized fluid from said source of hydraulic pressure to flow through said second conduit into said second chamber.

13. The device of claim 12, wherein:

said first and second actuators are elements of a piloted manifold into which said first and second conduits are connected in fluid communication.

* * * * *